United States Patent Office 3,489,061
Patented Jan. 13, 1970

3,489,061
CUTTING MACHINE HAVING WORK HOLDING MEANS AND CUTTING TOOL STOP MEANS
Edward John Hardress Saunderson, Newbury, England, assignor to Saunderson & Costin Limited, Newbury, England, a British company
Filed July 31, 1967, Ser. No. 657,160
Claims priority, application Great Britain, Aug. 4, 1966, 35,019/66
Int. Cl. B23c 1/00, 3/00, 7/00
U.S. Cl. 90—11     3 Claims

ABSTRACT OF THE DISCLOSURE

An apparatus for machining a substantially vertical face of a workpiece including a clamping device for gripping the workpiece and a circular-face type machining tool rotatable about the axis of the face thereof and linearly movable in the plane of the face of the tool wherein a stop mounting is positioned on the opposite side of the plane of movement from the clamping device and includes a stop finger which extends from the mounting to a position near the plane of movement so as to provide lateral location of the workpiece prior to being gripped by the clamping device. A disc is mounted coaxial with and is greater diameter than the tool. The stop mounting permits resilient reflection of the finger from the inoperative position thereof when engaged by the disc to enable the tool to pass the finger without engaging it, and permitting the finger to thereafter return to the operative position thereof.

---

This invention concerns apparatus for machining a substantially vertical face of a workpiece.

According to this invention, the apparatus comprises opposed clamping means movable together in a horizontal direction to grip the workpiece, a rotary face-type machining tool with means for traversing the working face of the tool in a plane parallel to the direction of clamping while its axis of rotation is perpendicular to the direction of traverse, a stop mounting lying on the opposite side of the plane of traverse from the clamping means, a stop finger extending from the mounting to near the plane of traverse, so as to provide lateral location of the workpiece prior to being gripped by the clamping means, and a disc coaxial with the tool and of greater diameter, the stop mounting permitting resilient deflection of the finger from its operative position when engaged by the disc, to enable the tool to pass the finger without engaging it, and permitting the finger to thereafter return to the operative position.

Preferably the apparatus has two stop mountings, each having its respective finger, two lying spaced apart along one side of the clamping means.

An embodiment of the invention is described below with reference to the accompanying drawings in which.

Figure 1:
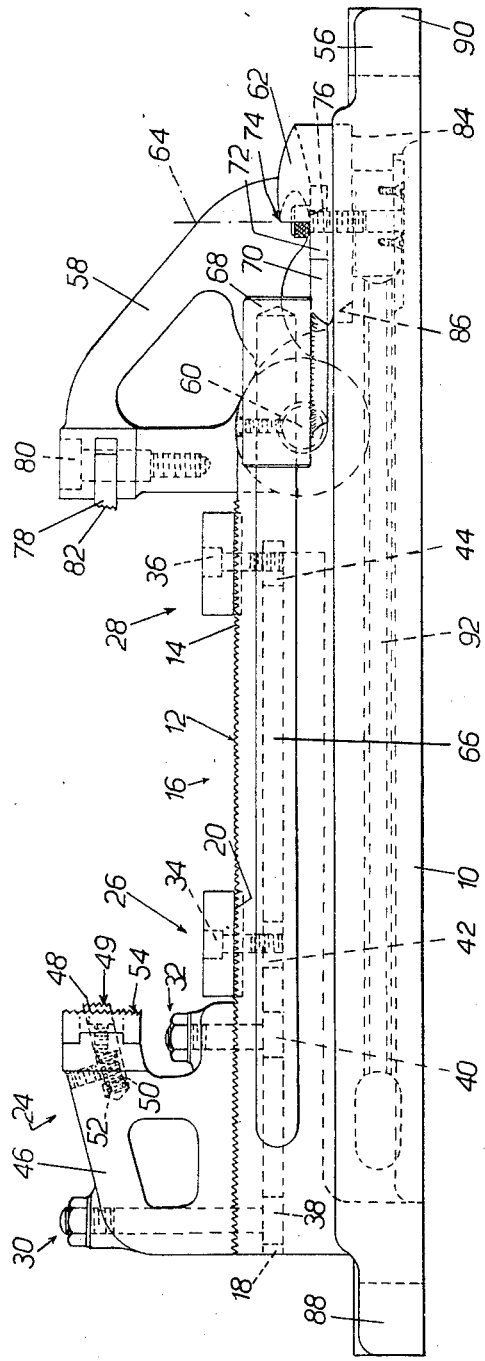
FIGURE 1 is a front elevation of a vice.

Refering to FIGURE 1, the vice comprises a body 10 which is an integral casting and presents a mounting surface 12 which has projections and grooves 14 of uniform width and spacing along the length of the surface and extending across the width thereof. Extending along the length of the surface 12 is a channel 18 which, when viewed end-on as in FIGURE 3, has the form of an inverted T. In this channel are mounted various members which have downwardly facing surfaces 20 and 22; these have projecting from them inverted T-shaped registers which can slide along the channel 18. Components 24, 26 and 28 have bolts 30, 32, 34 and 36 respectively passing through them, which bolts also screw into respective T-shaped members 38, 40, 42, and 44 enabling the components 24 to 28 to be tightened securely down on to the surface 14. Clearly these members can be rigidly adjusted to lie in line at various points along the length of the channel 18. The individual components are described below in more detail.

Component 24 constitutes a first jaw; it comprises an integral casting 46 which has the bolts 30 and 32 passing through it and a small member 48 presenting the first gripping face 49 and mounted to slide in a cavity 50 in the casting 46, being urged outwards thereof by a spring 52. The downwardly facing surface of the casting has teeth to co-operate with the grooves 14. Clearly the distance between the two nearest points along the groove 18 at which the component 14 can be rigidly fixed is determined by the width of the grooves 14; this is best understood from FIGURE 1. As best seen in FIGURE 1, the small member 48 normally projects outwards beyond a gripping face 54 on the casting 46. The member however is not so long as the cavity 50 and can be depressed to lie totally within the cavity. The face 54 can be plain, serrated or soft, and the face 49 is hardened and serrated. The soft type of face can have a particular shape to suit irregular workpieces.

It is further seen from FIGURE 1 that the cavity 50 is inclined downwards towards the outer end of the casting 46.

Components 26 and 28 can be of any form and size which is suitable for the work being carried out on the machine. These do not have teeth for engaging the grooves 14 because they are only subjected to downward compressive forces. As alternative to the bolts 34 and 36, the components could have slots and be located by deep T-nuts.

Mounted on a lower part 56 of the support 10 is a component 58, constituting the second jaw. The jaw 58 is mounted to pivot in a vertical plane about a solid cylindrical axis 60 which is further mounted to pass horizontally and transversely to the channel 18 through the base 10. Clearly the second jaw 58 can move towards or away from the first jaw 24, while remaining in line with the channel 18.

The pivoting movement of the jaw 58 about the axis 60 is caused by rotation of a cam 62 about its vertical axis 64.

Rotation of the cam 62 is achieved by rotating a handle 66 which lies in a socket 68 rigidly attached to the cam 62 by a bracket 70. The handle 66 can be easily pulled out of the socket 68. Referring to the plan view of the cam as viewed in FIGURE 2, and using the numerals of the clock for ease of description, the portion from 6 clockwise to 12 is of a uniform small thickness; this is shown as 72 in each figure. From 12 o'clock clockwise to 6, the thickness of the cam is increasing substantially uniformly to reach the maximum thickness at line 74. In this embodiment merely the sloping part of the cam is used, the lower part of the cam being operated on in the drawings. As viewed therefore the component 58 is, referred to FIGURE 1, at its extreme clockwise position. To rotate the jaw 58 in an anti-clockwise direction about the pivot 64 the cam 62 is rotated so that the surface 76 of a cam follower of the component 58 is caused to ride up the sloping surface of the cam.

Mounted in the inwardly lying part of the jaw 58 is a member 78. The member 78 can loosely rotate about a vertical axis 80, but cannot move at all vertically or linearly in a horizontal plane.

Figure 2:
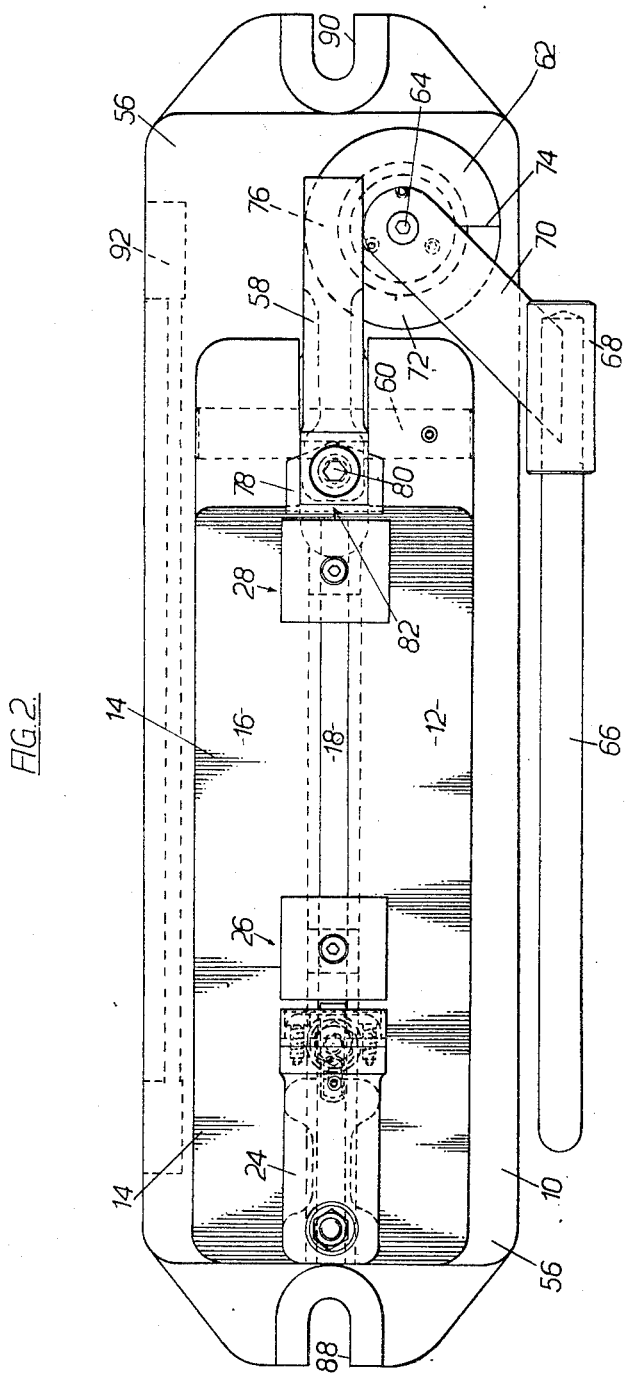
FIGURES 2 and 3 are a plan and an end elevation respectively of the vice.

It has a gripping face 82 which lies substantially inwards of the centre of the pivot 60, as viewed in FIGURES 1 and 2. In other words, as the cam is rotated to turn the jaw 58 in an anti-clockwise direction, the face 82 moves inwards and downwards towards the component 24. The axis 80 could alternatively be horizontal. The gripping face 82 of the jaw 78 can have a horizontal and/or vertical V-groove machined in it so that round bar can be gripped.

The lower surface 84 of the cam 62 has a strong frictional engagement with the surface 86 which it engages in the base 10.

When using the vice to simply grip a single workpiece, the workpiece is held against the face 82. A support member 28 can be placed under the workpiece to hold it sufficiently high in the vice. Clearly the support 28 can have any form and this is very useful when it is required to hold an irregularly shaped workpiece. With the bolts 30 and 32 loose, the first jaw 24 can be raised to disengage the teeth 20 from the grooves 14 and the whole component can be moved down the groove 18 so that the face 49 abuts the side of the workpiece opposite to that of the face 82. The bolts 30 and 32 are then tightened down so that the teeth 20 and grooves 14 mesh and are rigidly engaged by the tightening of the bolts against the T members 38 and 40. During this operation the handle 66 has been in the position shown, i.e. in line with the channel 18.

To complete the gripping action of the vice the handle 66 is then rotated in an anti-clockwise direction about the pivot 64. As described the jaw 58 rotates anti-clockwise about its pivot 60 so that the face 82 is pressed into tight engagement with the workpiece. During this pressing action the jaw 78 is moving about its axis 80 to become suitably aligned with any irregularity or out of parallel which is present in the faces which the two jaws are engaging. The jaw 78 is moving over top centre, hence it moves inwards and downwards to press the workpiece down on to the support 36, or in the absence of the support, the surface 16 of the base.

At the same time the workpiece is being pressed into tighter engagement with the face of the member 48 on the opposite jaw. As it urges that face inwards against the spring 52, the member 48 moves downwards so that the workpiece is pressed even more tightly downwards against the support 36 or the surface 16. This last mentioned movement can continue until the gripping face of the member 48 is coplanar with a gripping face 54 on the jaw 24. Clearly the movement of the face 82 during a half turn of the cam 62 must be greater than the sum of the distance between two successive grooves 14, and the travel of the member 48.

The angle of the taper of the cam surface, in conjunction with the friction between the surfaces 84 and 86 of the cam and the base 10, must be sufficient to hold the jaw 58 in its gripping engagement of the workpiece, and then allow the handle 66 to be removed for the convenience of the operator.

It is to be noted that the jaw 24 is substantially integral with the base 10 by virtue of the bolts 30 and 32, further that the jaw 58 during is gripping engagement with the workpiece is moving over top-dead-centre of the pivot 60, and further that the member 48 urges the workpiece inwards and downwards towards the surface 54. By virtue of these three features it is clear that the workpiece is pressed firmly downwards against the support 36 or the surface 14. While performing cutting actions on the workpiece the vice can be firmly bolted down by means of the notches 88 and 90. After the cutting operation the workpiece is readily and quickly released from the vice by replacing the handle 66 and rotating the cam clockwise. Clearly the jaw 24 can be then either unbolted and moved to another required position, or left where it is for a similar workpiece to be inserted as described.

The vice is particularly suitable for gripping successive workpieces which are either identical or nearly so, for example castings, the dimensions of which vary slightly. The variation in dimension is readily accommodated because of the angular range of the cam which may be used for closing the component 58 against the workpiece.

Clearly all the components 24, 26, 28, 78 and 62 can be readily replaced to accommodate workpieces of different shapes and sizes.

Figure 3:
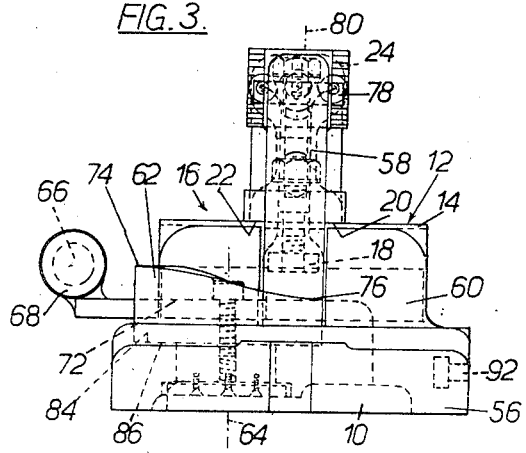

An important feature of the vice, as best seen in FIGURES 2 and 3, is that the only parts which project upwards of the surface 14 are the jaws. These can be made as narrow as possible since the stress to which they are subjected is principally compressive, and castings can readily be made solid and of cast iron.

The vice is particularly advantageous where it is required to perform a straddle milling operation on a workpiece. Two parallel and coaxial cutter discs can easily lie on opposite sides of the jaws as seen in FIGURE 3, and can move along the entire length of the vice without interferring with the vice tightening and loosening mechaism. The radius of the cutter discs need only be the absolute minimum required for the workpiece because the workpiece can be raised as high as is wanted in the vice. This is because the members 48 and 78 are positioned near the top of the jaws, and they are not subjected to substantial bending stresses which urge the jaws to rotate as they do in conventional vices wherein the bottom of the jaws are urged to move inwards more than the top of the jaws.

Figure 4:
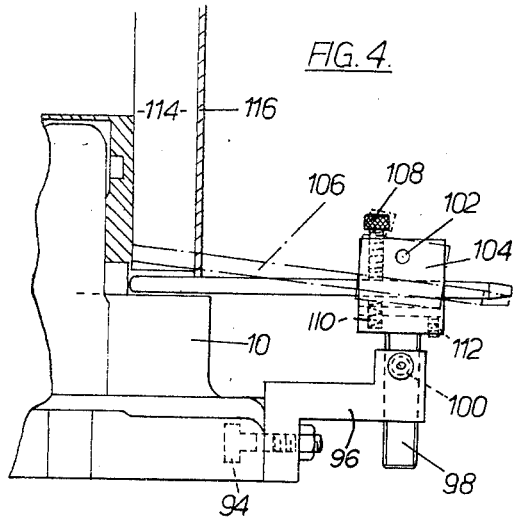
FIGURES 4 and 5 are a side elevation and an end view of a workstop.
Figure 5:
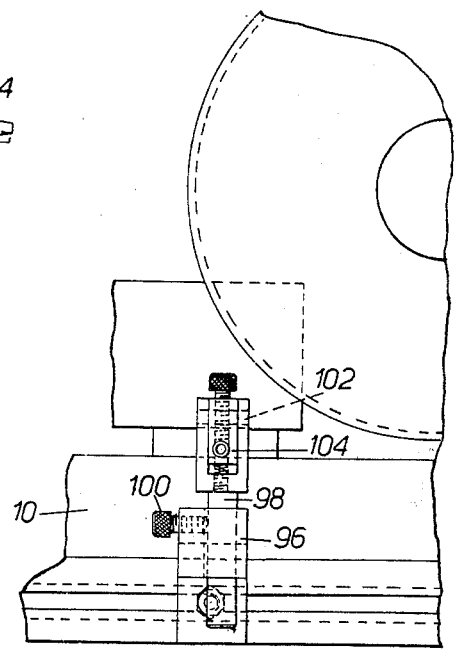

One side surface of the base 10 has a groove 92 cut into it. The groove has the form of a horizontal T in section, but wider portions at its extreme ends as seen in FIGURE 2. Into this groove can be inserted two stop mountings, one of which is seen in FIGURES 4 and 5. Each mounting has a T-shaped register 94, which can be slid along the groove 92, and fastened at any position therealong.

The mounting consists principally of a bracket 96 through which passes a beam 98 having a flat surface along one side. The beam 98 can move vertically and can be fastened by means of a set screw 100 acting on the flat surface and thus preventing rotation. Pivoted to rotate relatively to the beam 98, about a horizontal pivot 102 is a supporting block 104.

Passing through the block 104 is a stop finger 106. This lies generally horizontal and transversely to the vice; it can be moved along its length and fastened by means of a set screw 108. A spring 110 is mounted to urge the probe 106 upwards; its extreme upward position is determined by an adjusting screw 112.

In use the probe 106 is adjusted along its length to serve as a stop to an operator against which he abuts the workpiece, introducing it to the vice from the opposite side of the probe 106.

For particular use in straddle milling, the cutter wheel 114 can be provided with a disc 116 which is coaxial and of slightly larger radius. When the cutter is in the vicinity of the probe 106, the disc will serve to depress the probe so that it is not cut by the cutter disc.

I claim:

1. In an apparatus for machining a substantially vertical surface on a workpiece including a base having a surface for supporting the workpiece, clamping means for gripping the workpiece and a circular-faced machine cutting tool which is power driven to rotate about the axis of the face thereof, said tool also being linearly movable in the plane of said face while rotating, the improvement comprising a disc which is of larger diameter than said tool, which has a smooth edge, and which is rigidly and concentrically mounted for concomitant rotation on the side of the tool opposite the clamping means, a stop mounting block rigidly associated with said base, and lying on the side of the plane of the tool-face opposite to the clamping means, an elongate stop finger held in said mounting block and extending therefrom towards said clamping means, said finger being slidingly and fastenably settable along the length thereof relative to said stop mounting block, said finger being also pivotable about an axis which passes across said disc when viewed in the direction of the axis of rotation of said disc, and biasing means located in said mounting block for urging said finger upwards about said pivot such that the free end of the finger lying remote from the mounting block is positionable higher than said base surface, lower than said pivot, and between the plane of the disc and the plane of the machine tool face, so that said finger is settable in said block with the free end thereof positioned to initially abuttingly locate the face of the workpiece to be machined, the finger then being pivotally deflectable downwards by an engagement with said disc as the tool and the disc are moved linearly to machine said surface while the workpiece is gripped by the clamping means, said finger then being pivotally restored to the initial position thereof by said biasing means as said disc and cutting tool linearly retract.

2. An apparatus as claimed in claim 1 wherein the clamping means comprise the jaws of a machine-bed vice, the body of the vice forming the said base and having a horizontal groove along the side thereof, said apparatus further comprising a bracket for carrying said mounting block, said bracket cooperating with said groove and including means for permitting fastening of said bracket at any position along said groove, and means for vertically and adjustably fastening said mounting block relatively to said bracket.

3. An apparatus as claimed in claim 1 wherein said mounting block comprises a beam rigidly fastenable to said base, an adjusting screw carried by said beam, and a supporting block for rigidly carrying the finger, said supporting block being tiltable about said pivot axis of said finger, said apparatus further comprising spring means mounted operatively between said beam and said supporting block for urging said block against said adjusting screw, said screw being adjustable in the direction of said biasing to set the height of said free end of said finger.

References Cited

UNITED STATES PATENTS

| 586,359 | 7/1897 | Holt | 269—236 |
| 819,887 | 5/1906 | Jones | 269—236 |
| 1,729,286 | 4/1925 | Elfring | 90—11.2 |
| 2,464,297 | 3/1949 | Ertl | 269—203 X |

GIL WEIDENFELD, Primary Examiner

U.S. Cl. X.R.

143—85; 269—237, 289